United States Patent [19]

Nishina et al.

[11] Patent Number: 4,492,034
[45] Date of Patent: Jan. 8, 1985

[54] DISPLACEMENT MEASURING DEVICE

[75] Inventors: Shingo Nishina; Seigo Takahashi; Shigeru Ohtani, all of Kanagawa, Japan

[73] Assignee: Mitutoyo Mfg. Co., Ltd., Tokyo, Japan

[21] Appl. No.: 450,767

[22] Filed: Dec. 17, 1982

[30] Foreign Application Priority Data

Dec. 18, 1981 [JP] Japan .................. 56-205911

[51] Int. Cl.³ ............................................ G01B 7/02
[52] U.S. Cl. .................................... 33/170; 33/172 E
[58] Field of Search ................ 33/166, 170, 172 E

[56] References Cited

U.S. PATENT DOCUMENTS

| 2,293,502 | 8/1942  | Hermann        | 33/172 E |
| 3,226,833 | 1/1966  | Lemelson       | 33/166   |
| 3,289,310 | 12/1966 | Stone          | 33/170   |
| 3,483,626 | 12/1969 | Huttel         | 33/172 E |
| 3,611,578 | 10/1971 | Montgomery et al. | 33/170 |
| 3,987,552 | 10/1976 | Raiteri        | 33/172 E |
| 3,996,669 | 12/1976 | Anichini       | 33/172 E |
| 4,424,630 | 1/1984  | Aceti          | 33/172 E |

FOREIGN PATENT DOCUMENTS

| 398988  | 3/1966 | Switzerland    | 33/170 |
| 2039673 | 8/1980 | United Kingdom | 33/170 |

Primary Examiner—Richard R. Stearns
Attorney, Agent, or Firm—Koda and Androlia

[57] ABSTRACT

A displacement measuring device wherein a measuring element slidably supported on a main frame is provided and the length or the like of a work to be measured is measured from a displacement value of said measuring element when the forward end of said measuring element is abutted against said work to be measured, characterized in that said device comprises: a feed member provided on said main frame in a manner to be able to reciprocate within a predetermined range; a vertically movable member interlocked with and driven by said feed member, to thereby vertically move said measuring element; and a load applying means for applying a load to said vertically movable member through the utilization of a relative movement between said feed member and said vertically movable member when said vertically movable member is braked after said measuring element has been abutted against said work to be measured.

16 Claims, 2 Drawing Figures

DISPLACEMENT MEASURING DEVICE

BACKGROUND OF THE INVENTION

1. Field of the Invention

This invention relates to displacement measuring devices, and more particularly, it is concerned with improvements in a displacement measuring device suitable for use in a dial gauge, linear gauge, limit gauge or the like, wherein there is provided a measuring element slidably supported on a main frame and the length or the like of a work to be measured is measured from a displacement value of the measuring element when the forward end of the measuring element is abutted against the work to be measured.

2. Description of the Prior Art

Heretofore, there has been known a dial gauge or linear gauge wherein there is provided a measuring element slidably supported on a main frame and the length or the like of a work to be measured is measured from a displacement value when the forward end of the measuring element is abutted against the work to be measured, or a limit gauge wherein it is detected similarly from the displacement value of the measuring element whether the dimensions of the work to be measured are within a limit of allowance, for example, a tolerance.

In the displacement measuring devices of the type described, generally, in order to perform an accurate measurement, it is necessary to provide a load applying means for abutting the forward end of the measuring element against the work to be measured under a predetermined measuring load.

Furthermore, in order to facilitate repeated measurements of the works to be measured having dimensions identical with one another, it is necessary that, when the measuring element is abutted against the work to be measured under a predetermined measuring load, a measured value at this time is quickly detected and the measuring element can be quickly retracted and further advanced by a predetermined value from the state of abutment.

However, with the load applying means in the conventional displacement measuring devices, there have been such disadvantages that, for example, the load applying means is a spring to bias the measuring element in one direction, and a value of deformation of this spring is varied depending on a movement value of the measuring element, whereby uniform measuring load is not obtainable.

Further, the arrangement for performing a detection when the measuring element is abutted against the work to be measured under a measuring load beyond a predetermined value has been complicated and consequently, has presented problems in construction and cost.

SUMMARY OF THE INVENTION

It is therefore the primary object of the present invention to provide a displacement measuring device capable of constantly obtaining a predetermined measuring load irrespective of the position of the measuring element.

Another object of the present invention is to provide a displacement measuring device having a simplified construction capable of detecting the measuring load when it exceeds a predetermined value and stopping the movement of the measuring element.

A further object of the present invention is to provide a displacement measuring device capable of quickly moving and stopping the measuring element, to thereby facilitate repeated measurements.

To achieve one of the above-described objects, the present invention contemplates that, in a displacement measuring device wherein a measuring element slidably supported on a main frame is provided and the length or the like of a work to be measured is measured from displacement value of said measuring element when the forward end of said measuring element is abutted against the work to be measured, the device comprises: a feed member provided on the main frame in a manner to be able to reciprocate within a predetermined range; a vertically movable member interlocked with and driven by the feed member to thereby vertically move the measuring element; and a load applying mmeans for applying a load to the vertically movable member through the utilization of a relative movement between the feed member and the vertically movable member is braked after the measuring element has been abutted against the work to be measured.

Furthermore, to achieve one of the above-described objects, the present invention contemplates that, in the aforesaid displacement measuring device, the feed member is a feed screw shaft and said vertically movable member is a member having internal threads theredably coupled onto said feed screw shaft and being rectilinearly movable through the rotation of said feed screw shaft.

Furthermore, to achieve one of the above-described objects, the present invention contemplates that, in the aforesaid displacement measuring device, the feed member is driven by a motor and there are provided a load detecting means for detecting a load of more than a predetermined value of the load applying means and a control means for stopping said motor in operation in response to a detection signal from said load detecting means.

Furthermore, to achieve one of the above-described objects, the present invention contemplates that the load applying means is interposed between the feed member and the vertically movable member and, when the driving force of the vertically movable member exceeds a predetermined value, a movement of said feed member relative to the vertically movable member is permitted, whereby the relative movement is converted into a load.

Furthermore, to achieve one of the above-described objects, the present invention contemplates that, in the aforesaid displacement measuring device, the load detecting means is a limit switch "ON" or "OFF" operated when the relative movement between the feed member and the vertically movable member exceeds a predetermined value.

Furthermore, to achieve one of the above-described objects, the present invention contemplates that, in the aforesaid displacement measuring device wherein a measuring element slidably supported on a main frame is provided and the length or the like of a work to be measured is measured from a displacement value of the measuring element when the forward end of the measuring element is abutted against the work to be measured, there are provided: a feed screw shaft; an internally threaded member threadably coupled onto the feed screw shaft; a cylinder housing said internally threaded member, loosely coupled onto the feed screw shaft and permitting a portion of the internally threaded member to project outwardly therefrom and move relative thereto within a predetermined range in the projecting state; and constant load springs interposed between opposite ends of the internally threaded member and opposing inner ends of the cylinder in the axial direction of the feed screw shaft and within the cylinder, for constantly biasing said internally threaded member to a neutral position; and further, the portion projecting from the cylinder, of the internally threaded member is interlocked with the measuring element.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION EMBODIMENT

Figure 1:
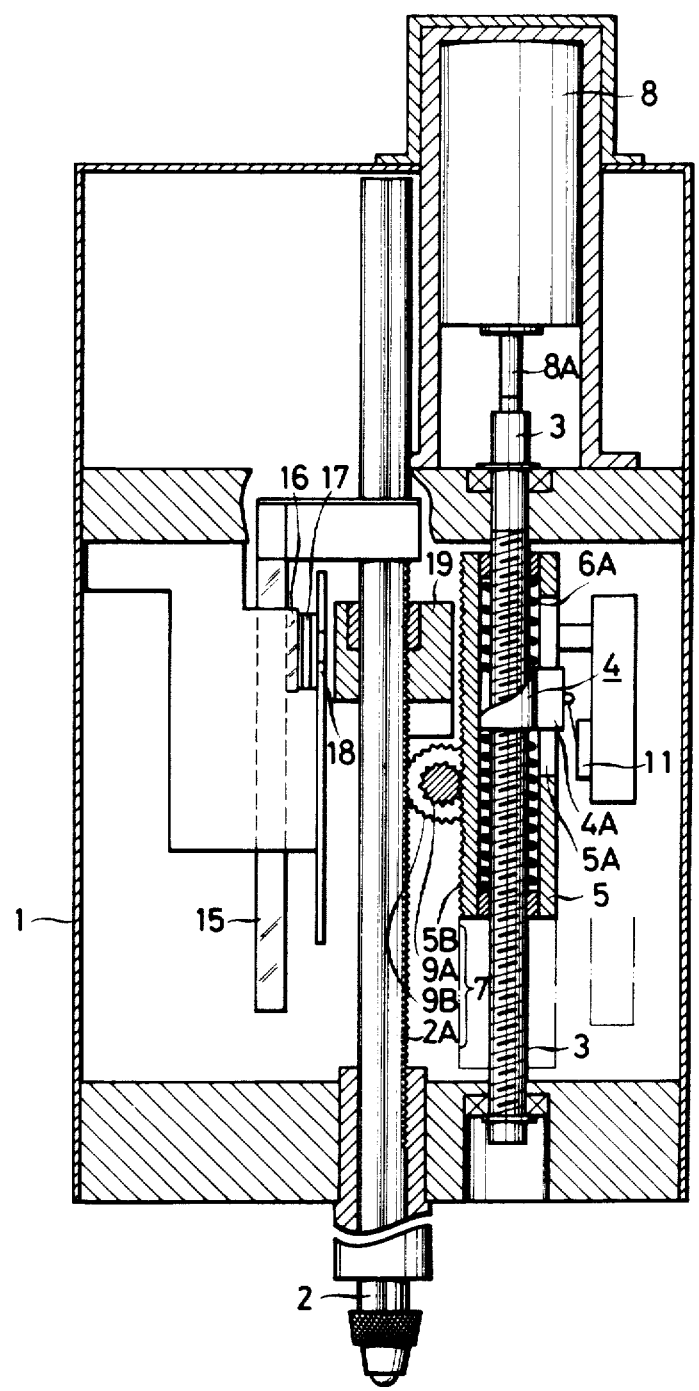
FIG. 1 is a sectional view showing an embodiment of the displacement measuring device according to the present invention.

Description will hereunder be given of an embodiment of the present invention with reference to the drawings. According to this embodiment, in a displacement measuring device wherein a measuring element 2 slidably supported on a main frame 1 is provided and the length or the like of a work to be measured is measured from a displacement value of the measuring element 2 when the forward end of the measuring element 2 is abutted against the work to be measured, there are provided: a feed screw shaft 3 disposed in parallel to the moving direction of the measuring element 2; an internally threaded member 4 threadably coupled onto this feed screw shaft 3; a cylinder 5 housing the internally threaded member 4, loosely coupled onto the feed screw shaft 3 and permitting a portion of the internally threaded member 4 to project outwardly therefrom and move relative thereto within a predetermined range in the projecting state; and constant load springs 6A and 6B interposed between opposite ends of the internally threaded member 4 and opposing inner ends of the cylinder 5 in the axial direction of the feed screw shaft 3 and within the cylinder 5, for constantly biasing the internally threaded member 4 to a neutral position; and furthter, the portion 4A projecting from the cylinder 5, of the internally threaded member 4 is interlocked with the measuring element 2 through a gear mechanism 7.

Coaxially connected to the aforesaid feed screw shaft 3 is an output shaft 8A of a motor 8, whereby the feed screw shaft 3 is rotatably driven.

the projecting portion 4A of the internally threaded member 4 projects outwardly through an elongate groove 5A formed in the cylinder 5 in the axial direction thereof, whereby, when the feed screw shaft is rotated, the projecting portion 4A is prevented from rotating by the elongate groove 5A, but can move along the elongate groove 5A in the axial direction.

Furthermore, the constant load springs 6A and 6B can floatingly support the internally threaded member 4 in the neutral position within the cylinder 5, and, when the cylinder 5 reaches a stroke end, the internally threaded member 4 is permitted to move relative to the cylinder 5 within a predetermined range against the resiliency of one of these constant load springs 6A and 6B. Additionally, referring to the drawing, the constant load spring 6A at the upper side is made larger in spring constant than the constant load spring 6B at the lower side, whereby a difference in the vertical direction due to the gravity of the cylinder 5 is eliminated, so that the internally threaded member 4 can be maintained at the neutral position through the biasing forces equally working in the vertical direction.

The aforesaid gear mechanism 7 includes: a rack 5B formed on the side surface opposite to the elongate groove 5A, of the cylinder 5 in the axial direction of the cylinder 5; a small gear 9A being in mesh with this rack 5B; a large gear 9B provided coaxially and integrally with this small gear 9A; and a rack 2A formed on the side surface of the measuring element 2 in a manner to be meshed with this large gear 9B. As a result, the vertical movement of the cylinder 5 is imparted through this gear mechanism 7 in such a manner that this vertical movement is enlarged and converted into a vertical movement of the measuring element 2 in a direction opposite to the above movement of the cylinder 5.

The projecting portion 4A of the internally threaded member 4 is in contact of a neutral state with a limit switch 11 supported on the cylinder 5 through a bracket 10, and, when the internally threaded member 4 is moved relative to the cylinder 5 upwardly or downwardly within a predetermined range, opens the limit switch 11.

More specifically, when the measuring element 2 abuts against the work to be measured, the cylinder 5 reaches the stroke end because the measuring element 2 is interlocked with the cylinder 5 through the gear mechanism 7. When the screw feed shaft 3 is further rotated under this condition, the internally threaded member 4 compresses the constant load spring 6A or 6B and moves relative to the cylinder 5, to thereby open the limit switch 11.

Figure 2:
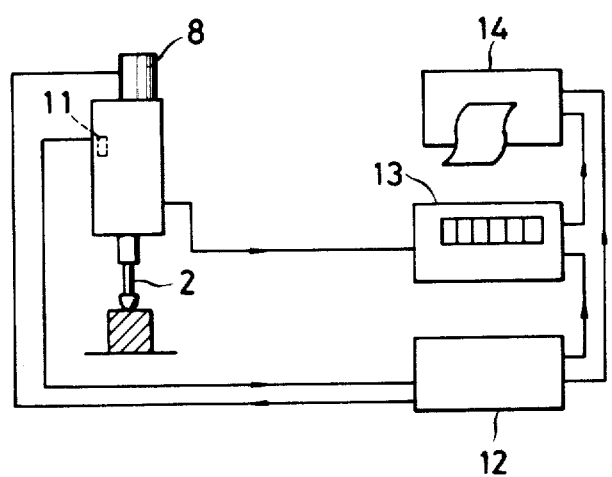
FIG. 2 is a block diagram showing the control system in the above-described embodiment.

As shown in FIG. 2, this limit switch 11 supplies an "ON" or "OFF" signal to a control device 12. This control device 12 outputs a zero set command signal to a counter 13 to indicate a measured value signal from an encoder, which will be described hereunder, and further outputs a print command signal to a printer 14 interlocked with this counter 13 so that the printer 14 can print out a valued read by the counter 13.

Furthermore, when the limit switch 11 is opened, the control device 12 temporarily stops the aforesaid motor 8 in response to the "ON" or "OFF" signal from the limit switch 11, outputs a command signal for zero setting or printing the indicated value of the counter 13 at the time, and thereafter, reversely rotates the motor 8 and exercises a control so that a repeated measurement can be performed.

In the drawing, designated at 15 is a main scale integrally connected to the measuring element 2, movable in parallel thereto and formed thereon with light transmitting portions and non-transmitting portions alternately of each other, 16 an index scale formed thereon with light transmitting portions and non-transmitting portions alternately of each other in the same manner as in the main scale 15, for detecting a displacement value of the measuring element 2 in the vertical direction from a displacement value of the main scale 15 due to a movement of the measuring element 2, 17 a spring for biasing this index scale 16 to be brought into contact with the main scale 15, to thereby constitute a rotation lock for the measuring element 2, and 18 a photoelectric type displacement detecting device including light receiving elements to receive light beams transmitted through the main scale 15 and the index scale 16 from a light source, not shown.

As aforesaid, this photoelectric type displacement detecting device 18 is of such an arrangement that the output thereof is inputted to the counter 13, whereby a displacement value of the measuring element 2 from a reference portion is digitally indicated.

Description will now be given of operation of the above-described embodiment.

When the motor 8 is driven by means of the control device 12, the feed screw shaft 3 is rotated in a required direction, whereby the cylinder 5 is moved integrally with the internally threaded member 4 through the constant load spring 6A or 6B. At this time, the limit switch 11 moves integrally with the cylinder 5 through the bracket 10, so that no displacement of the limit switch 11 relative to the internally threaded member 4 will occur.

When the cylinder 5 moves, the measuring element 2 is moved through the gear mechanism 7 in a direction opposite to the cylinder 5, and abuts against the work to be measured.

When the measuring element 2 abuts against the work to be measured, the cylinder 5 is stopped at the same time, while, the feed screw shaft 3 is rotatably driven by the motor 8, whereby the internally threaded member 4 compresses the constant load spring 6A or 6B to be moved relative to the cylinder 5.

When the internally threaded member 4 is moved relative to the cylinder 5 within a predetermined range, the limit switch 11, which has been turned "ON" by a projecting portion 4A integrally formed on the internally threaded member 4 is opened, whereby an "OFF" signal outputted from the limit switch 11 at this time is supplied to the control device 12.

The control device 12 is adapted to stop the motor 8 in response to the "OFF" signal from the limit switch 11 and output a command signal whereby the indicated value on the counter 13 at this time is zero set or printed out by the printer 14.

Further, upon zero setting or printing out of the indicated value, the control device 12 drives the motor in a direction opposite to the above, whereby the measuring element 2 is separated from the work being measured to be ready for another measurement or a repeated measurement.

As a result, in the present embodiment, the measurement can be performed under one and the same measuring load, or more specifically, through a deformation value of the constant load spring 6A or 6B in accordance with a movement value of the internally threaded member 4 relative to the cylinder 5, irrespective of the moving direction or the movement value of the measuring element 2, and moreover, simplification of the electric circuits including a so-called self running, data read-in and the like can be contemplated.

Furthermore, this displacement measuring device can automatically operate the measuring element 2 through the control device 12, so that labor-saving and automation in measuring, remote-control measuring of foot control by use of a depressing switch can be adopted.

In addition, the above-described embodiment is constructed such that the aforesaid operation can be continuously repeated by means of the control device 12, however, each operation may be performed manually or operations may be effected in response to signals from the outside. Furthermore, the above-described embodiment is constructed such that the detected value from the photoelectric type detecting device 18 is indicated on the counter 13 and printed out by the printer 14, however, the invention need not necessarily be limited to this specific form, but, for example, the device may be interlocked with a display device such as a cathode ray tube or a calculating machine such as a computer.

Furthermore, the above-described embodiment is constructed such that the measuring element 2 is moved in the vertical direction, however, the measuring element 2 may be moved in the horizontal direction.

Addtionally, the above-described embodiment is of such an arrangement that a generation of a measuring load of a certain value due to an abutment of the measuring element 2 against the work to be measured is detected from a positional relationship between the projecting portion 4A of the internally threaded member 4 and the limit switch 11, however, this arrangement may be replaced by an arrangement having a load detecting mmeans for detecting that the constant load spring 6A or 6B is compressed beyond a predetermined value, and consequently, for example, any other means such as a photoelectric type means or means using magnetic contact points may be adopted.

Further, the cylinder 5 and the measuring element 2 are interlocked with each other through the gear mechanism 7, however, the cylinder 5 and the measuring element 2 may be integrally connected to each other as far as the stroke of the cylinder 5 is made equal to that of the measuring element 2. In this case, the measuring element 2 and the cylinder 5 function as the rotation locks for each other, such advantage can be offered that other rotation locks for these members are removed.

Furthermore, the above-described embodiment is of such an arrangement that the measuring element 2 is reciprocated in the relations between the feed screw shaft 3 and the internally threaded member 4, however, this arrangement may be replaced by an arrangement including: a feed member provided on the main frame 1 and capable of reciprocating within predetermined range; a vertically movable member interlocked with this feed member to be driven, to thereby move the measuring element 2 in the vertical direction; and a load applying means for applying a load to the vertically movable member through the utilization of a relative movement between the feed member and the vertically movable member when the vertically movable member is braked after the measuring element 2 has been abutted against the work to be measured. In consequence, such an arrangement may be adopted that, in place of the feed screw shaft 3 and the internally threaded member 4, there are provided a wire guided round a pulley to be reciprocated and a member secured to and driven by this wire, and this member is connected in front and at the back to the vertically movable member through constant compression springs.

Furthermore, such an arrangement may be adopted that the feed member is made into a rotatable member, a vertically movable member formed with a gear is disposed in the rotating direction of the rotatable member through constant load springs, and the measuring element is reciprocated by means of the gear of this vertical member.

Furthermore, the present invention may include the case where the above-described displacement measuring device is provided thereon with an anvil in opposed relation to the measuring element 2, to thereby provide a micrometer. In this case, when the measuring element 2 and the anvil are directed outwardly, the inner side or inner diameter of the work to be measured can be measured.

With the above-described arrangement according to the present invention, such an outstanding advantage can be offered that a measuring load of a predetermined value can be constantly obtained irrespective of the moving direction and the movement value of the measuring element.

It should be apparent of those skilled in the art that the abovedescribed embodiments are merely representative, which represent the applications of the principles of the present invention. Numerous and varied other arrangements can be readily devised by those skilled in the art without departing from the spirit and the scope of the invention.

What is claimed is:

1. A displacement measuring device wherein a measuring element slidably supported on a main frame is provided and the length or the like of a work to be measured is measured from a displacement value of said measuring element when the forward end of said measuring element is abutted against said work to be measured, characterized in that there are provided: a feed screw shaft; an internally threaded member threadably coupled onto said feed screw shaft; a cylinder housing surrounding said internally threaded member, loosely coupled onto said feed screw shaft and permitting a projecting portion of said internally threaded member to project outwardly therefrom and move relative thereto within a predetermined range; and constant load springs interposed between opposite ends of said internally threaded member and opposing inner ends of said cylinder in the axial direction of said feed screw shaft and within said cylinder, for constantly biasing said internally threaded member to a neutral position; and further, said portion projecting from the cylinder, of the internally threaded member is interlocked with said measuring element through said constant load springs and said cylinder.

2. A displacement measuring device as set forth in claim 1, characterized in that said projecting portion of the internally threaded member projects outwardly through an elongated groove formed in the cylinder housing in the axial direction thereof, whereby, when the feed screw shaft is rotated, the projecting portion is prevented from rotating by the elongated groove, but can move along the elongated groove in the axial direction.

3. A displacement measuring device as set forth in claim 2, characterized in that said constant load springs can floatingly support the internally threaded member in the neutral position within the cylinder housing and, when the cylinder housing reaches a stroke end, the internally threaded member is permitted to move relative to the cylinder housing within a predetermined range against the resiliency of one of these constant load springs.

4. A displacement measuring device as set forth in claim 3, characterized in that said constant load spring at the upper side is made larger in spring constant than the constant load spring at the lower side, whereby a difference in the vertical direction due to the gravity of the cylinder housing is eliminated, so that the internally threaded member can be maintained at the neutral position through the biasing forces equally working in the vertical direction.

5. A displacement measuring device as set forth in claim 4, characterized in that said feed screw shaft is driven by a motor and there are provided a limit switch for detecting a load of more than a predetermined value of said load applying means and a control means for stopping said motor in operation in response to a detection signal from said limit switch, said limit switch generates the detection signal by "ON" or "OFF" operated when the relative movement between said internally threaded member and said cylinder housing exceeds a predetermined value, said projecting portion of the internally threaded member is in contact of a neutral state with the limit switch, and, when the internally threaded member is moved relative to the cylinder housing upwardly or downwardly within a predetermined range, operates the limit switch.

6. A displacement measuring device as set forth in claim 3, characterized in that said feed screw shaft is dirven by a motor and there are provided a limit switch for detecting a load of more than a predetermined value of said load applying means and a control means for stopping said motor in operation in response to a detection signal from said limit switch, said limit switch generates the detection signal by "ON" or "OFF" operated when the relative movement between said internal threaded member and said cylinder housing exceeds a predetermined value, said projecting portion of the internally threaded member is in contact of a neutral state with the limit switch, and, when the internally threaded member is moved relative to the cylinder housing upwardly or downwardly within a predetermined range, operates the limit switch.

7. A displacement measuring device as set forth in claim 2, characterized in that said constant load spring at the upper side is made larger in spring constant than the constant load spring at the lower side, whereby a different in the vertical direction due to the gravity of the cylinder housing is eliminated, so that the internally threaded member can be maintained at the neutral position through the biasing forces equapply working in the vertical direction.

8. A displacement measuring device as set forth in claim 7, characterized in that said feed screw shaft is dirven by a motor and there are provided a limit switch for detecting a load of more than a predetermined value of said load applying means and a control means for stopping said motor in operation in response to a detection signal from said limit switch, said limit switch generates the detection signal by "ON" or "OFF" operated when the relative movement between said internal threaded member and said cylinder housing exceeds a predetermined value, said projecting portion of the internally threaded member is in contact of a neutral state with the limit switch, and, when the internally threaded member is moved relative to the cylinder housing upwardly or downwardly within a predetermined range, operates the limit switch.

9. A displacement measuring device as set forth in claim 2, characterized in that said feed screw is driven by a motor and there are provided a limit switch for detecting a load of more than a predetermined value of said load applying means and a control means for stopping said motor in operation in response to a detection signal from said limit switch, said limit switch generates the detection signal by "ON" or "OFF" operated when the relative movement between said internal threaded member and said cylinder housing exceeds a predetermined value, said projecting portion of the internally threaded member is in contact of a neutral state with the limit switch, and, when the internally threaded member is moved relative to the cylinder housing upwardly or downwardly within a predetermined range, operates the limit switch.

10. A displacement measuring device as set forth in claim 1, characterized in that said constant load springs can floatingly support the internally threaded member in the neutral position within the cylinder housing and, when the cylinder housing reaches a stroke end, the internally threaded member is permitted to move relative to the cylinder housing within a predetermined range against the resiliency of one of these constant load springs.

11. A displacement measuring device as set forth in claim 10, characterized in that said constant load spring at the upper side is made larger in spring constant than the constant load spring at the lower side, whereby, a difference in the vertical direction due to the gravity of the cylinder housing is eliminated, so that the internally threaded member can be maintained at the neutral position through the biasing force equally working in the vertical direction.

12. A displacement measuring device as set forth in claim 11, characterized in that said feed screw shaft is driven by a motor and there are provided a limit switch for detecting a load of more than a predetermined value of said load applying means and a control means for stopping said motor in operation in response to a detection signal from said limit switch, said limit switch generates the detection signal by "ON" or "OFF" operated when the relative movement between said internal threaded member and said cylinder housing exceeds a predetermined value, said projecting portion of the internally threaded member is in contact of a neutral state with the limit switch, and, when the internally threaded member is moved relative to the cylinder housing upwardly or downwardly within a predetermined range, operates the limit switch.

13. A displacement measuring device as set forth in claim 10, characterized in that said feed screw shaft is driven by a motor and there are provided a limit switch for detecting a load of more than a predetermined value of said load applying means and a control means for stopping said motor in operation in response to a detection signal from said limit switch, said limit switch generates the detection signal by "ON" or "OFF" operated when the relative movement between said internal threaded member and said cylinder housing exceeds a predetermined value, said projecting portion of the internally threaded member is in contact of a neutral state with the limit switch, and, when the internally threaded member is moved relative to the cylinder housing upwardly or downwardly within a predetermined range, operates the limit switch.

14. A displacement measuring device as set forth in claim 1, characterized in that said constant load spring at the upper side is made larger in spring constant than the constant load spring at the lower side, whereby a difference in the vertical direction due to the gravity of the cylinder housing is eliminated, so that the internally threaded member can be maintained at the neutral position through the biasing forces equally working in the vertical direction.

15. A displacement measuring device as set forth in claim 14, characterized in that said feed screw shaft is driven by a motor and there are provided a limit switch for detecting a load of more than a predetermined value of said load applying means and a control means for stopping said motor in operation in response to a detection signal from said limit switch, said limit switch generates the detection signal by "ON" or "OFF" operated when the relative movement between said internal threaded member and said cylinder housing exceeds a predetermined value, said projecting portion of the internally threaded member is in contact of a neutral state with the limit switch, and, when the internally threaded member is moved relative to the cylinder housing upwardly or downwardly within a predetermined range, operates the limit switch.

16. A displacement measuring device as set forth in claim 1, characterized in that said feed screw shaft is driven by a motor and there are provided a limit switch for detecting a load of more than a predetermined value of said load applying means and a control means for stopping said motor in operation in response to a detection signal from said limit switch, said limit switch generates the detection signal by "ON" or "OFF" operated when the relative movement between said internal threaded member and said cylinder housing exceeds a predetermined value, said projecting portion of the internally threaded member is in contact of a neutral state with the limit switch, and, when the internally threaded member is moved relative to the cylinder housing upwardly or downwardly within a predetermined range, operates the limit switch.

* * * * *